(12) United States Patent
Fuchs

(10) Patent No.: US 6,396,425 B1
(45) Date of Patent: May 28, 2002

(54) DISTURBANCE DETECTION IN A DATA SIGNAL

(75) Inventor: Gerrit Fuchs, Murg (DE)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/787,734
(22) PCT Filed: Sep. 22, 1999
(86) PCT No.: PCT/EP99/07039
§ 371 (c)(1), (2), (4) Date: Mar. 21, 2001
(87) PCT Pub. No.: WO00/17876
PCT Pub. Date: Mar. 30, 2000

(30) Foreign Application Priority Data

Sep. 23, 1998 (EP) ............................................. 98402335

(51) Int. Cl.⁷ ................................................ H03M 1/06
(52) U.S. Cl. ....................................... 341/118; 341/159
(58) Field of Search ............................ 341/118, 56, 57, 341/58, 132; 375/213, 244; 327/75; 704/204, 224, 226

(56) References Cited

U.S. PATENT DOCUMENTS

| | | | | | |
|---|---|---|---|---|---|
| 5,381,092 A | * | 1/1995 | Freedman | ................... | 324/303 |
| 5,642,383 A | * | 6/1997 | Suzuki | ....................... | 375/241 |
| 5,673,046 A | * | 9/1997 | Hirajima et al. | ............ | 341/159 |

\* cited by examiner

*Primary Examiner*—Brian Young
*Assistant Examiner*—Joseph J Lauture
(74) *Attorney, Agent, or Firm*—Joseph S. Tripoli; Paul P. Kiel

(57) ABSTRACT

Disturbance detection is used to detect anomalies in the behaviour of the data signal. The data signal may for example be a readout signal in an optical drive. An upper and a lower envelope signal value for the data signal are determined in a determined time interval ($\Delta(m-1)$). During the following time interval ($\Delta(m)$) a difference value is computed by subtracting from each other the values of the lower from the upper envelope signals. A disturbance is detected in case the difference value is smaller than a predetermined border value.

9 Claims, 5 Drawing Sheets

DISTURBANCE DETECTION IN A DATA SIGNAL

Figure 1:
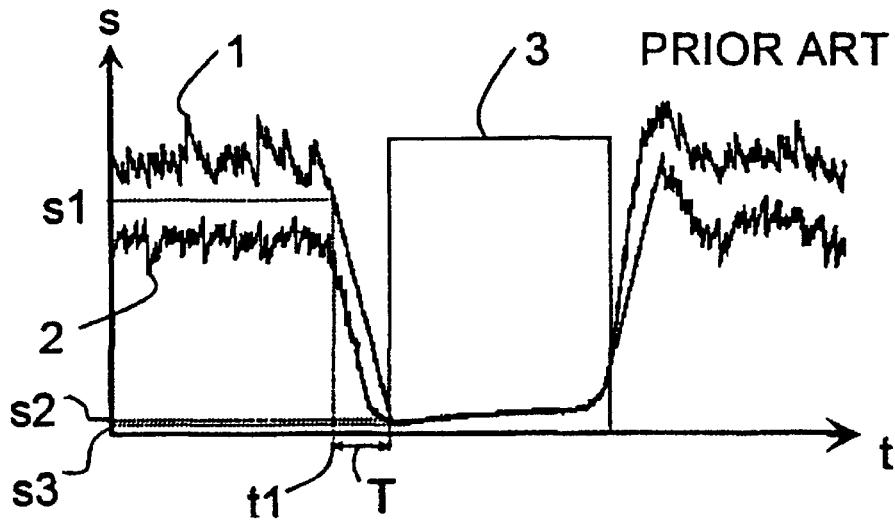

This application claims the benefit under 35 U.S.C. § 365 of International Application PCT/EP99/07039, filed Sep. 22, 1999, which was published in accordance with PCT Article 21(2) on Mar. 30, 2000 in English, and which claims the benefit of EP 98402335/8, filed Sep. 23, 1998.

The invention relates to the field of disturbance detection in a data signal.

Disturbance detection in a data signal is used to detect anomalies in behaviour of the data signal. The data signal may for example be a readout signal in an optical drive like a CD or DVD—player or any other type of data reading device. Disturbance detection is required to initiate a freeze of some parts of a data acquisition and servo processing system while data is not usable due to for example black dots, scratches, silver dots or fingerprints on a data carrier. It is advantageous to recognise disturbances as fast as possible in order to fix the data acquisition and to release it again afterwards.

The data signal has a dynamic behaviour, which may be confined between an upper and a lower envelope. In case of a disturbance in the data signal the dynamic behaviour is modified and a difference value which is equal to the subtraction of the values of the upper and lower envelope between each other may become smaller than a predetermined border value. Monitoring the difference value allows determining whether it is smaller than the predetermined border value in which case a disturbance in the data signal is detected.

However, a delay occurs between the occurrence of a defect and its detection because the envelope signal in analogue circuits is formed from the data signal by a peak detection circuit or a low pas filter. In digital devices, the upper envelope is set to a value equal to a value of the data signal if the value of the latter is greater than the upper envelope value. If during a determined period of time the upper envelope value has not been increased then it will be decreased stepwise by a predetermined value.

The lower envelope is, in a way similar to the upper envelope, set to a value equal to a value of the data signal if the value of the latter is smaller than the lower envelope value. If during a determined period of time the lower envelope value has not been decreased then it will be increased by the predetermined value.

Hence if the data signal is disturbed, e.g. it adopts a relatively low dynamic behaviour, the upper and/or lower envelope values tend to approach the data signal value and the difference value becomes smaller than the predetermined border value. A time delay in which the upper or lower envelope values reach a value near to the data signal value depends on the period of time, as the upper or lower envelope values in case of fast changes follow the data signal value, especially, if the envelope values stepwise decrease or increase as mentioned above. The time lapse appears to be relatively long in most cases of disturbance. As a consequence the detection of the disturbance, which is done after the time lapse, is delayed by a relatively long time following the effective occurrence of the disturbance.

It is an object of the present invention to reduce the time lapse occurring between a disturbance in the data signal and the detection of the disturbance.

It is another object of the present invention to have a time lapse of a determined length between the disturbance and the detection of the disturbance.

The problem has been solved according to the features in the independent claims. Advantageous embodiments are described in dependent claims.

The disadvantage of a delay between data and envelope signal will be avoided if instead of a usual envelope signal an envelope signal is used which corresponds more to an evaluation signal, which is formed in such a manner that values of the envelope signal are set equal to a corresponding value of the data signal taken in a predetermined time interval. Setting values of an envelope signal equal to a corresponding value of the data signal taken in a predetermined time interval has the advantages that an envelope signal has been generated having a constant value for a predetermined time period and also follows very quickly the value of the current data signal independent whether the data signal increases or decreases. Due to setting the values of an envelope signal equal to a corresponding value of the data signal taken in a predetermined time interval a delay between the data signal and the new kind of envelope signal corresponds as maximum to the length of the predetermined time interval and it is independent from changes in the data signal. The new kind of envelope signal follows immediately the data signal independent of an increasing or decreasing data signal. Therefore, a disturbance signal very fast can be generated by evaluating the new kind of envelope signal. Such disturbance signals are for example the well known defect or mirror signal.

The predetermined time interval is equal or longer as a maximum run length of the data signal. The maximum run length of the data signal corresponds for example to 11 clock periods in case of a CD. The upper or lower or both envelope signals have to be formed in the manner as mentioned above dependent on the manner in which the data signal has been generated and according to the kind of disturbance that has to be detected in a fast manner. For example, a threshold value for the upper envelope curve can be used to generate a defect signal in case of a direct current coupled data signal as it is well known from the prior art. The mirror signal is similar generated in such a case. The difference between the upper and lower envelope curve is mostly used in case of an alternating current coupled data signal. The invention is applicable to any kind of data signal and disturbance signal generation.

The values of an upper or lower envelope signal are set equal to respectively a maximum and a minimum value of the data signal taken before in a predetermined time interval and the computing of the difference value between an upper and a lower envelope signal is done in a time interval subsequent to said predetermined time interval in which the envelope signals have been formed. In a preferred embodiment the predetermined time interval and subsequent time intervals are taken to be of equal length.

Several predetermined time intervals are used in an overlapped manner in a further embodiment for a further reduced access time in which the envelope value will be set to a corresponding value of the data signal. In such a way different periods can be generated for example dependent on the direction of the data signal. The predetermined time intervals are therefore arranged in a phase-shifted manner.

Values of a lower envelope signal are preferred set equal to respectively a first average value and a second average value of the data signal taken before in predetermined time intervals of different length to generate a mirror signal.

According to an embodiment of the invention, a method for detecting a disturbance in a data signal comprises the steps of obtaining a lower and upper envelope signal for the data signal by setting the values of the lower and the upper envelope signal equal to respectively a minimum and a maximum value of the data signal taken in a predetermined time interval.

computing a difference value by substracting from each other values of the lower from the upper envelope signals, determining a disturbance if the difference value is smaller than a predetermined border value.

A device for detecting a disturbance in a data signal comprises an envelope generator, an input of which receives the data signal and providing an envelope value according to a value of the data signal received in a predetermined time interval, a disturbance signal generator which receives signals representative of an envelope generated by the envelope generator and a register interface which outputs to the envelope generator a signal representative of a predetermined time interval and to the defect signal generator a signal representative of a predetermined evaluation value.

For carrying out the method as mentioned above said disturbance signal generator receives signals representative of an upper and a lower envelope generated by the envelope generator giving to the upper and lower envelope value respectively a maximum and a minimum value of the data signal received in the predetermined time interval. The register interface provides a predetermined border value as evaluation value and the disturbance signal generator is in this embodiment a defect signal generator which computes a difference value by subtracting the lower envelope from the upper envelope. The defect signal generator generates a defect signal if the difference value is smaller than the predetermined border value.

Figure 3:
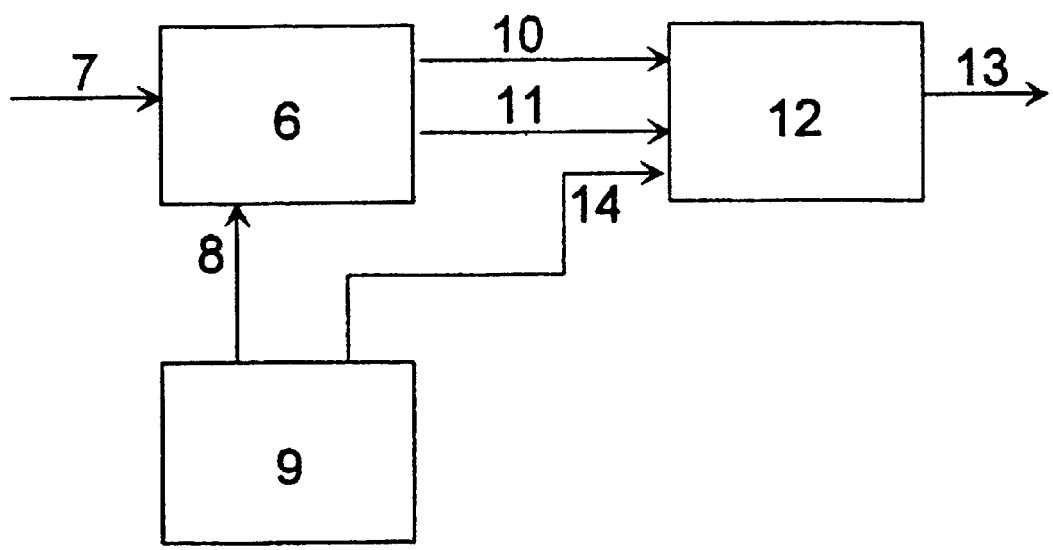
Figure 4:
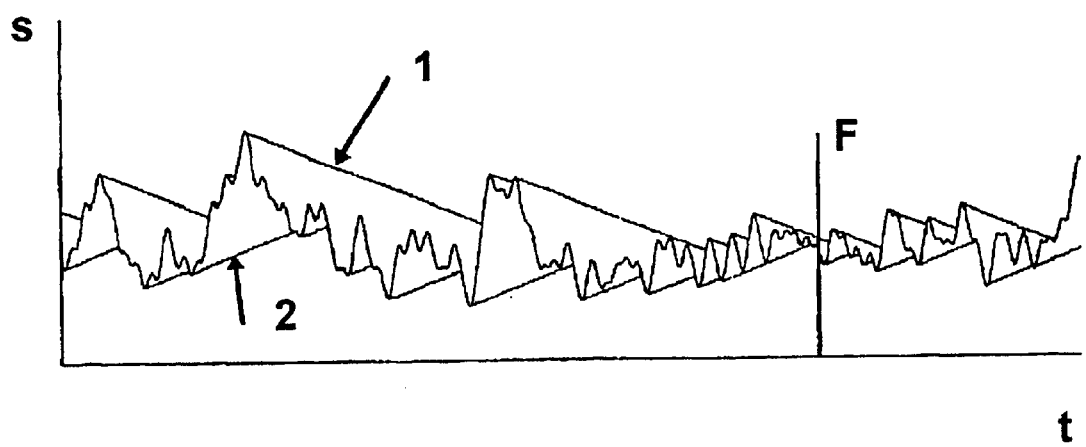
Figure 5:
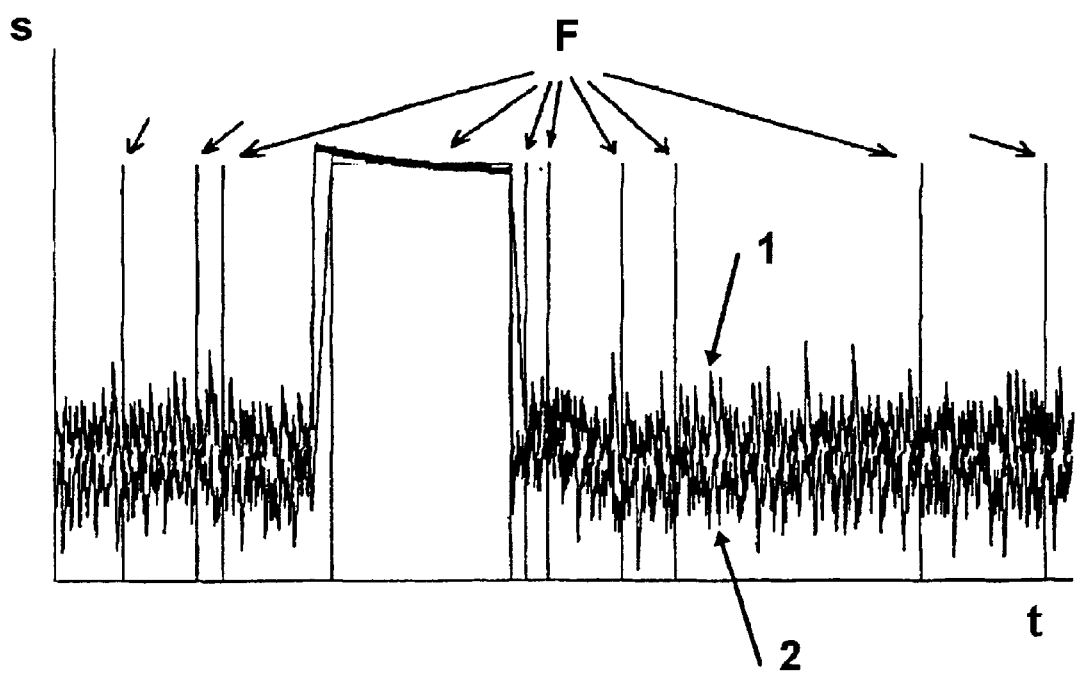
Figure 6:
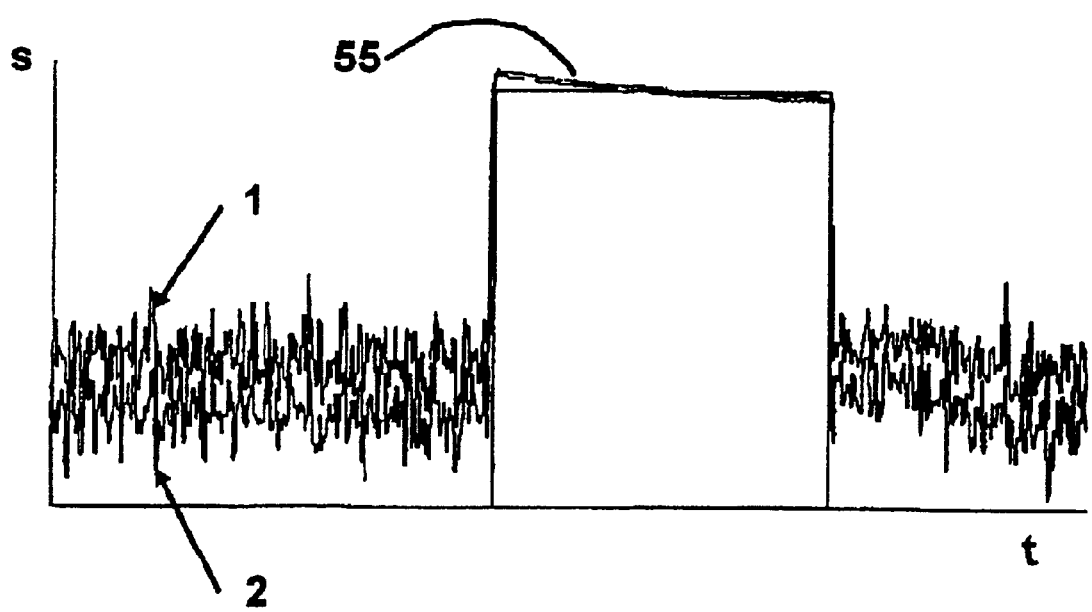

In the following, examples of carrying out the invention will be described referring to drawings, wherein FIG. 1 contains a graph of an upper and lower envelope signal to illustrate a prior art solution, FIG. 2 contains a graph of an upper and lower envelope signal to illustrate the invention, FIG. 3 contains a block diagram of a device according to the invention, FIG. 4 shows an upper and lower envelope signal to illustrate the envelope generation according to a prior art solution, FIG. 5 shows the result of using an increased envelope update counter to illustrate the envelope generation according to a prior art solution, FIG. 6 shows the comparable result according to the invention.

The graph in FIG. 1 comprises on one axis a time scale t and on another axis a data signal value scale s. A curve 1 and a curve 2 represent respectively an upper and a lower envelope of a data signal (not shown) as known from prior art. A value of the data signal is at all times comprised between the curves 1 and 2.

The values in curve 1 are set equal to a value of the data signal if the latter is greater than the former. If during a determined time interval $\Delta t$ the value in curve 1 has not been increased then it is decreased by a fixed value $\Delta s$. If during a plurality of consecutive determined time intervals $\Delta t$ the value in curve 1 was decreased by the fixed value $\Delta s$, this results in a linear decrease of the values in curve 1 as is shown in a time lapse T of the curve 1. Hence if at a moment t1 the value in curve 1 drops from s1 to s2, then the time lapse T required for the value of the curve 1 to decrease from s1 to s2 is at least $$T=(s1-s2)\cdot \Delta t/\Delta s.$$

The values in curve 2 are set equal to the value of the data signal if the latter is smaller than the former. If during the determined time interval $\Delta t$ the value in curve 2 has not been decreased then it is increased by a fixed value $\Delta s$. During the time lapse T in FIG. 1 the values in curve 2, which are at all times smaller than the values of the not shown data signal decrease to a value s3 smaller or equal to s2, which is the value of curve 1 at the end of the time lapse T.

After the time lapse T a defect signal 3 is generated which indicates that a disturbance in the data signal has occurred. The defect signal 3 is generated whenever the difference value $\Delta d=s2-s3$ is smaller than a predetermined border value b, i.e., $\Delta d<b$.

The curves 1 and 2 may be obtained for a data signal which is a high frequency signal after readout of an optical disk, e.g., a Compact Disk, a magneto-optical disk or a Digital Versatile Disk. The disturbance which causes the HF to decrease in value and in its dynamic behaviour at the beginning of the time lapse T, and the curve 1 to decrease from s1 to s2 during the time lapse T may be caused by a black dot pattern on a track of the disk being read. The intensity of light reflected by a black dot pattern is relatively low and the value of the resulting HF signal is decreased to relatively small values.

Other causes for disturbances in an HF signal may for example be a scratch, a silver dot causing relatively high values of the resulting HF signal or fingerprints on the track being read.

The data signal may for example be a sampled HF signal, i.e., a HF signal for which discrete values are obtained at time intervals. In this case the predetermined time intervals $\Delta t$ may comprise a determined number of HF signal samples.

A defect signal should be high, if there is too little HF information available in the HF signal. So the defect signal is set to high if upper envelope minus lower envelope is smaller as a border b.

The defect signal comes late for a black dot pattern. In this example, the black dot defect time is about 0,5 msec. The servo processing, working with about 200 khz, will calculate the servo loops around 100 times, while in black dot.

Better would be to speed up the envelope update counter for the envelope creation. However, there is a limit as will be shown later.

The border value is set with software and optional a hysteresis can be used in all figures.

Figure 2:
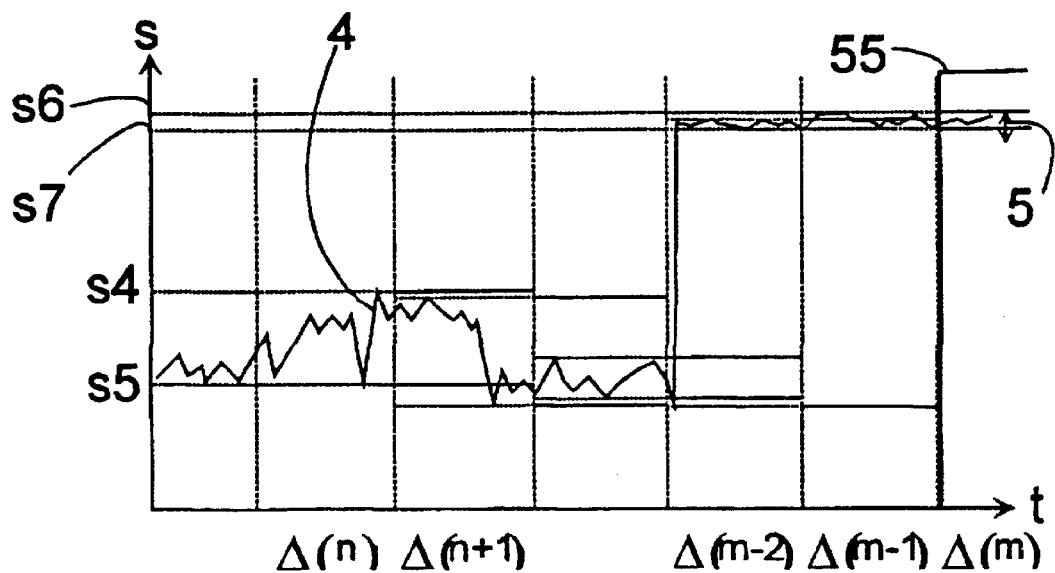

The graph in FIG. 2 comprises on one axis a time scale t and on another axis a data signal value scale s. A curve 4 represents in a simplified manner the value of the data signal at the time t. The time scale t is divided in time intervals $\Delta(n)=\Delta(n+1)=\ldots=\Delta(m)$, n and m being integers and a value of such a time interval being equal to a determined time interval which may be adjusted depending on the required performance. According to the invention a maximum s4 of the values of the data signal in the time interval $\Delta(n)$ is given to the upper envelope, and a minimum s5 of the values of the data signal in the time interval $\Delta(n)$ is given to the lower envelope. A difference value $\Delta d(n+1)=s4-s5$ of the upper and lower envelope values is subsequently computed, for example during the time interval $\Delta(n+1)$.

New upper and lower envelope values are determined for each time interval and their difference value computed subsequently during the next time interval. The difference value is compared to the predetermined border value b in order to determine a disturbance in the data signal is the difference value is smaller than the predetermined border values b.

During the time interval $\Delta(m-2)$ a disturbance in the data signal occurs resulting in an increase of the data signal value. Such a disturbance may for example be caused by a silver dot pattern on the track of the disk being read.

During the time interval Δ(m−1) the data signal exhibits a dynamic behaviour which makes it appear relatively stable. The upper and lower envelope values are set to s6 and s7 respectively. During the time interval Δ(m), the difference value Δd(m)=s6−s7 is computed and compared to the predetermined border value b which is represented in FIG. 2 using a double arrow 5 for reasons of better understanding only. Since Δd(m)<b a defect signal 55 is generated indicating that a disturbance has occurred in the data signal.

The defect signal 55 is thus generated in the time interval following the time interval Δ(m−1) during which the data signal has reached its relatively stable high value. No delay due to a linear increase of the lower envelope value as is known from prior art occurs, and as a consequence the delay between the generating of the defect signal and the occurrence of the disturbance is shortened as compared to prior art. The shortest delay may be obtained if the value of the time interval is chosen to comprise a rise time of the data signal from a usual value, like for example its value in time intervals Δ(n) and Δ(n+1), to a relatively high disturbance value in Δ(m−1). In this case the delay to generate the defect signal may be comprised between one and two time intervals.

Besides disturbances due to silver dots the invention may of course also be used to detect disturbances caused by black dots, scratches, fingerprints and others as in prior art.

The block diagram in FIG. 3 shows an envelope generator 6 which at an input 7 receives an HF data signal and at an input 8 a signal representative of the determined time interval from a register interface 9. The envelope generator outputs an upper and a lower envelope signal 10 and 11 respectively. The upper and lower envelope values are equal respectively to the maximum and the minimum of the HF data signal in the predetermined time interval. The envelope signals 10 and 11 are input to a defect signal generator 12. The latter receives at an input 14 from the register interface 9 a signal representative of the predetermined border value b. The defect signal generator computes the difference value from the upper and lower envelope values and compares the difference value to the predetermined border value b. If the difference value is smaller than the predetermined border value then a disturbance is determined indicating that a disturbance in the HF data signal has occurred, and the defect signal generator 12 produces at an output 13 a defect signal.

FIG. 4 shows an upper and lower envelope signal to illustrate the envelope generation according to a prior art solution. The envelope curves 1 and 2 don't follow immediately the data signal. A disturbance or a fault F in the data signal therefore will be very late detected.

FIG. 5 shows the result of using an increased envelope update counter to illustrate the envelope generation according to a prior art solution. If the envelope update counter rate will be increased more and more, as mentioned above, defects will be detected even if there are no defects. The major reason for this are the low frequency components in the data signal as for example the amplituded 3T signals in case of a CD. There is always a response delay proportional to the envelope update counter rate. Using double the envelope update counter rate will result in half the response time for the defect signal. Such problems have been solved by the invention as mentioned above.

FIG. 6 shows the comparable result according to the invention by setting the values of the envelope signal equal to a corresponding value of the data signal taken in a predetermined time interval. A corresponding defect signal 55 is immediately generated and no additional defects will be detected even if there are no defects. No delay occurs, and as a consequence the delay between the generating of the defect signal and the occurrence of the disturbance is shortened.

What is claimed is:

1. A method for detecting a disturbance in a data signal by obtaining an envelope signal for the data signal, and evaluating changes of the envelope signal comprising the steps of setting values of an envelope signal for a predetermined period equal to a corresponding value of the data signal taken in a predetermined time interval (Δ(n) ... Δ(m)).

2. A method for detecting a disturbance in a data signal according to claim 1, wherein the computing of the difference value between an upper and a lower envelope signal is done in a time interval (Δ(m)) subsequent to said predetermined time interval (Δ(m−1)) in which the envelope signals have been formed.

3. A method according to claim 1, wherein the predetermined time interval and subsequent time intervals are taken to be of equal length.

4. A method according to claim 1 wherein the predetermined time interval (Δ(n) ... Δ(m)) is equal or longer than a maximum run length of the data signal.

5. A method according to claim 1, wherein the predetermined time interval (Δ(n) ... Δ(m)) is overlapped and used in a phase shifted manner.

6. A method according to claim 1, wherein values of an upper or lower envelope signal are set equal to respectively a maximum and a minimum value of the data signal taken before in a predetermined time interval (Δ(n) ... Δ(m)).

7. A method according to claim 1, wherein values of a lower envelope signal are set equal to respectively a first average value and a second average value of the data signal taken before in predetermined time intervals of different length to generate a mirror signal.

8. A device for detecting a disturbance in a data signal by obtaining an envelope signal for the data signal, and evaluating changes of the envelope signal comprising an envelope generator, an input of which receives a lower and an upper envelope signal for the data signal and providing a lower and an upper envelope signal equal to respectively a maximum or a minimum value of the data signal received in a predetermined time interval (Δ(n) ... Δ(m)), a defect signal generator which receives signals representative of a lower and an upper envelope generated by the envelope generator for computing a difference value by subtracting from each other values of the lower from the upper envelope signals and for determining a disturbance if the difference value is smaller than a predetermined border value, a register interface which outputs to said envelope generator a signal representative of said predetermined time interval (Δ(n) ... Δ(m)) and to said defect signal generator a signal representative of said predetermined border value.

9. A device according to claim 8, wherein said disturbance signal generator (12) receives signals representative of an upper (10) and a lower (11) envelope generated by the envelope generator giving to the upper and lower envelope value respectively a maximum and a minimum value of the data signal received in the predetermined time interval, said register interface (9) provides a predetermined border value as evaluation value and the disturbance signal generator (12) as a defect signal generator computing a difference value by subtracting the lower envelope from the upper envelope and outputting a defect signal (13) if the difference value is smaller than the predetermined border value.

* * * * *